Patented July 13, 1937

2,086,690

UNITED STATES PATENT OFFICE 2,086,690

SULPHONATION PRODUCTS OF ACYLATED AMINES AND PROCESS OF MAKING SAME

Werner Zerweck, Frankfort-on-the-Main-Fechenheim, and Eduard Gofferjé, Frankfort-on-the-Main, Germany, assignors to General Aniline Works, Inc., New York, N. Y., a corporation of Delaware No Drawing. Application March 18, 1935, Serial No. 11,734. In Germany March 22, 1934

6 Claims. (Cl. 260—99.12)

Our invention relates to sulphonation products of acylated amines and process of making same and more particularly to derivatives of the aforesaid type of unsaturated aliphatic amines containing more than 8 carbon atoms. They are obtained by acting in any sequence on such amines with an acylating and a sulphonating agent.

The new products thus obtained are valuable agents for use in the textile industry. Particularly they are valuable wetting, dispersing and detergent agents.

In order to further illustrate our invention the following examples are given; but we wish it, however, to be understood that our invention is not limited to the particular products or reaction conditions stated therein.

Example 1

187 parts of oleylamine are mixed while stirring with an aqueous solution of 160 parts of crystallized sodium acetate in about 1000 parts of warm water. Then at about 35 to 40° C. 147 parts of benzoylchloride are added. After about 4 hours the reaction is complete. The reaction product, a colorless oil, is isolated by separation from the salt solution, purified and dissolved in about 325 parts of trichloroethylene. The solution is dehydrated, for instance by adding anhydrous sodium sulphate, which is then removed by filtration.

To 135 parts of such a solution, containing 59 parts of benzoyl-oleylamine, at 0° to 5° C. 55.6 parts of sulphuric acid monohydrate are slowly added. The reaction mass is kept for about 2 hours at this temperature, then poured on ice and neutralized with a caustic soda solution of 30° Bé. strength while stirring and cooling. The trichloroethylene is removed by distillation and the reaction product is separated from the salt solution. It is a slightly colored oil which is clearly soluble in water. The aqueous solution is an excellent wetting agent. The sulphonation product of benzoyl-oleylamine thus formed corresponds probably to the formula:

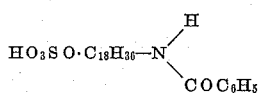

Practically the same product is obtained by at first sulphonating oleylamine and then benzoylating the sulphonation product.

The sulphonation product of methyl-benzoyl-oleylamine of the probable formula:

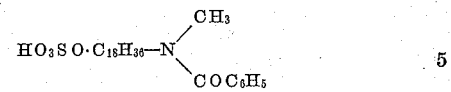

obtainable in an analogous manner by starting from methyloleylamine is a nearly colorless oil which solidifies, when cooled, to a crystalline mass. The sodium salt is easily soluble in water. The wetting power of such a solution is greater than that of a solution of the non-methylated product.

Example 2

196 parts of methyl-oleylamine are condensed with 112 parts of butyric acid chloride as described above and the reaction product is dissolved in about 480 parts of trichloroethylene.

170 parts of such a solution, containing 50 parts of the methyloleyl amide of butyric acid, are sulphonated by means of 55.6 parts of sulphuric acid monohydrate as described above and the reaction product is neutralized with a caustic soda solution. After distilling off the trichloroethylene and adding common salt to the remaining solution the sodium salt of the sulphonation product of methyl-butyryl-oleylamine of the probable formula:

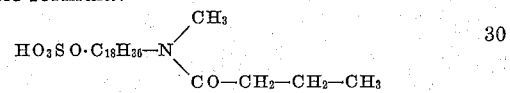

is isolated as a nearly colorless oil. The product is clearly soluble in water. The aqueous solution has a very good wetting effect.

We claim:

1. A process for producing sulphonation products of acylated amines which comprises acting in any sequence with an acylating and a sulphonating agent on an unsaturated aliphatic amine containing more than 8 carbon atoms.

2. Sulphonation products of acylated amines derived from unsaturated aliphatic amines containing more than 8 carbon atoms which sulphonation products are slightly colored oils and form alkalimetal salts which are easily soluble in water and have an excellent wetting effect.

3. Sulphonation products of acylated oleylamines of the general formula:

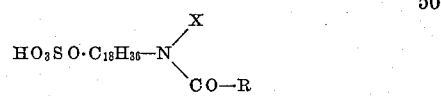

wherein X stands for a member of the group consisting of hydrogen and methyl and R for a member of the group consisting of alkyl and phenyl which sulphonation products are slightly colored oils and form alkali metal salts which are easily soluble in water and have an excellent wetting effect.

4. A sulphonation product of the formula:

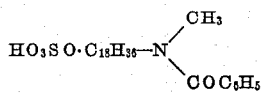

which is a slightly colored oil and forms an alkali metal salt which is easily soluble in water and has an excellent wetting effect.

5. A sulphonation product of the formula:

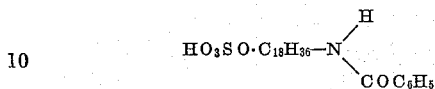

which is a slightly colored oil and forms an alkali metal salt which is easily soluble in water and has an excellent wetting effect.

6. A sulphonation product of the formula:

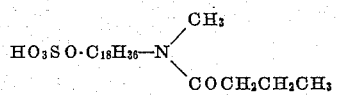

which is a slightly colored oil and forms an alkali metal salt which is easily soluble in water and has an excellent wetting effect.

WERNER ZERWECK.
EDUARD GOFFERJÉ.